United States Patent
Zafar et al.

(10) Patent No.: US 9,952,746 B2
(45) Date of Patent: Apr. 24, 2018

(54) SYSTEM AND METHOD FOR INCORPORATING AND USING WIDGETS IN AN ELECTRONIC PUBLICATION

(71) Applicant: barnesandnoble.com llc, New York, NY (US)

(72) Inventors: Kashif Zafar, New York, NY (US); Theresa Horner, Stamford, CT (US)

(73) Assignee: NOOK DIGITAL, LLC, New York, NY (US)

( * ) Notice: Subject to any disclaimer, the term of this patent is extended or adjusted under 35 U.S.C. 154(b) by 448 days.

(21) Appl. No.: 13/935,327

(22) Filed: Jul. 3, 2013

(65) Prior Publication Data

US 2014/0013251 A1    Jan. 9, 2014

Related U.S. Application Data

(60) Provisional application No. 61/667,604, filed on Jul. 3, 2012.

(51) Int. Cl.
*G06F 3/0484* (2013.01)
*G06F 3/0483* (2013.01)
*G06F 17/21* (2006.01)

(52) U.S. Cl.
CPC .......... *G06F 3/0483* (2013.01); *G06F 17/218* (2013.01)

(58) Field of Classification Search
CPC .. G06F 9/4443; G06F 17/3089; G06F 3/0482; G06F 17/218; G06F 3/048
See application file for complete search history.

(56) References Cited

U.S. PATENT DOCUMENTS

| | | | | |
|---|---|---|---|---|
| 7,761,800 | B2 * | 7/2010 | Chaudhri | B60K 35/00 715/764 |
| 8,407,576 | B1 * | 3/2013 | Yin | G06F 3/0481 715/206 |
| 2008/0201650 | A1 * | 8/2008 | Lemay | G06F 17/30884 715/763 |
| 2009/0235149 | A1 * | 9/2009 | Frohwein | G06F 17/30867 715/205 |
| 2010/0023874 | A1 * | 1/2010 | Frohwein | G06F 3/048 715/747 |
| 2010/0070886 | A1 * | 3/2010 | Poulsen | G06F 8/34 715/760 |

(Continued)

OTHER PUBLICATIONS

"Appearance Widgets Screen", WordPress Codex, May 4, 2011, p. 1, http://codex.wordpress.org/Appearance_Widgets_Screen.*

(Continued)

*Primary Examiner* — Namitha Pillai
(74) *Attorney, Agent, or Firm* — The Law Office of Michael J. Scheer

(57) ABSTRACT

A system and method for associating context-sensitive widgets in electronic publications, preferably eBooks. The publisher of the eBook tags certain sections of the electronic book as widget enabled, which allows the reader of the book to associate a widget with the tagged content. Preferably, the tags are generic to categories of widgets and the system allows a user to select one of several widgets in that category to associate with the content. Once the widget has been associated with the content by a user, the user can activate and run the widget, which is related to the content thereby providing a richer and highly personalized reading experience.

14 Claims, 8 Drawing Sheets

(56) References Cited

U.S. PATENT DOCUMENTS

2013/0151417 A1* 6/2013 Gupta .................. G06Q 20/382
 705/65

OTHER PUBLICATIONS

"Google play", Google store, Mar. 6, 2012, p. 1.*
"How to Activiate WordPress Widgets", by Adrian Grahams, Jun. 30, 2012, SmallBusiness.*
"How to use Widgets", Automatic, Mar. 28, 2006.*
Google search results.*

* cited by examiner

SYSTEM AND METHOD FOR INCORPORATING AND USING WIDGETS IN AN ELECTRONIC PUBLICATION

FIELD OF THE INVENTION

The present invention generally relates to digital publications, and more particularly to systems and methods for incorporating and using widgets in digital publications.

BACKGROUND OF THE INVENTION

A "widget" is defined as a very small, stand-alone, application performing one or a few simple functions usually within a specific context. Widgets come in many shapes and sizes, but two of the most popular types today are Web widgets and Desktop widgets. Web widgets are intended for use on (embedding in) webpages. Desktop widgets are installed on local computers. Web widgets are applications that can be embedded into third party web sites by any user on a page where they have rights of authorship. Widgets allow users to turn personal content into dynamic web apps that can be shared on websites where the code can be installed. For example, a "Weather Report Widget" could report today's weather by accessing data from the Weather Channel. For website visitors to view the widget, it must be embedded in a webpage. Widgets have also been added to various operating systems, such as in a clock application.

Web widgets may be considered as downloadable applications which look and act like traditional applications but are implemented using web technologies including JavaScript, Flash, HTML and CSS. Many widgets use and depend on web Application Programming Interfaces exposed either by the browser or by a widget engine.

SUMMARY OF THE INVENTION

The present invention operates in connection with a reader for digital publication, such as electronic books, eBooks. Although the following description concentrates on the use of widgets in connection with eBooks, those skilled in the art understand that the use of widgets described herein is equally applicable to other digital publications such as electronic magazines, newspapers, journals . . . . Historically, eBooks have been static pieces of content, capable of providing a limited experience reflecting a dated vision of story telling. They lack the ability to deliver a personalized and enhanced content experience. In part, this is due to the slow pace with which digital publications are evolving, as compared to the rapid pace of the transformation of digital information in general. However, with the tremendous success of applications ("Apps") and widgets within the mobile and online paradigms, eBooks are positioned for a fundamental transformation enabled by the present invention, know as Book Widgets.

A "widget" is defined as a very small application performing one or a few simple functions usually within a specific context. With this definition, it is possible to define an App as a collection of widgets hence making the App "context-independent" i.e., it is not reliant on an external context of use. Book Widgets according to the present invention is a platform that allows readers to associate context-sensitive widgets with their eBooks thereby providing a richer and highly personalized reading experience. Some examples of Book Widgets are: Wine pairing widget, Timer widget, Ingredient substitution widget. Weather widget, and Subway schedule widget. These widgets surface within the content (and hence the context) of an eBook page in a designed and considered way. The present invention enriches the reading experience by providing highly personalized, dynamic, in-context features for readers of eBooks.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
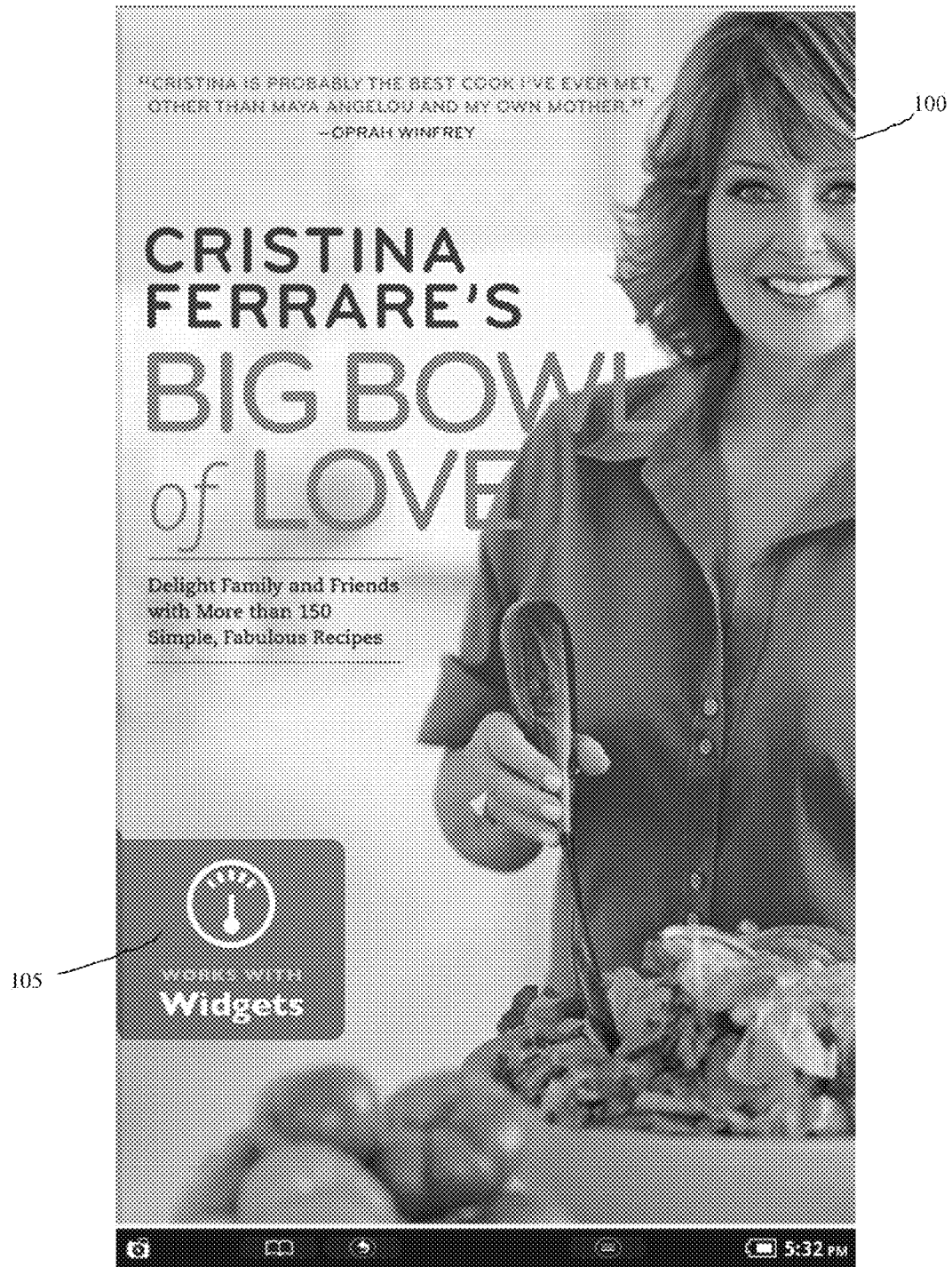
FIG. 1 illustrates an exemplary cover a widget enabled eBook.

A widget is defined as a very small application performing one or a few simple functions usually within a specific context. The Book Widgets of the present invention provides a platform that allows a user to associate a widget with specific content at a "widget-activated" point of an eBook and execute that widget under user control. FIG. 1 illustrates the cover of an eBook 100 that contains widgets according to the present invention. The inclusion of at least one widget in the eBook 100 is signified by the emblem 105 displayed on the cover. The eBook 100 illustrated in FIG. 1 is a cookbook and provides an example, as described below, of a Shopping List book widget that can be executed by the reader of the cook book 100 to assist her in generating a shopping list for preparing the meal described in a recipe in the cook book 100. As appreciated by those skilled in the art, this Shopping List book widget is merely exemplary of a widget that can be associated with, and used in connection with an eBook to enhance the reading experience.

Figure 2:
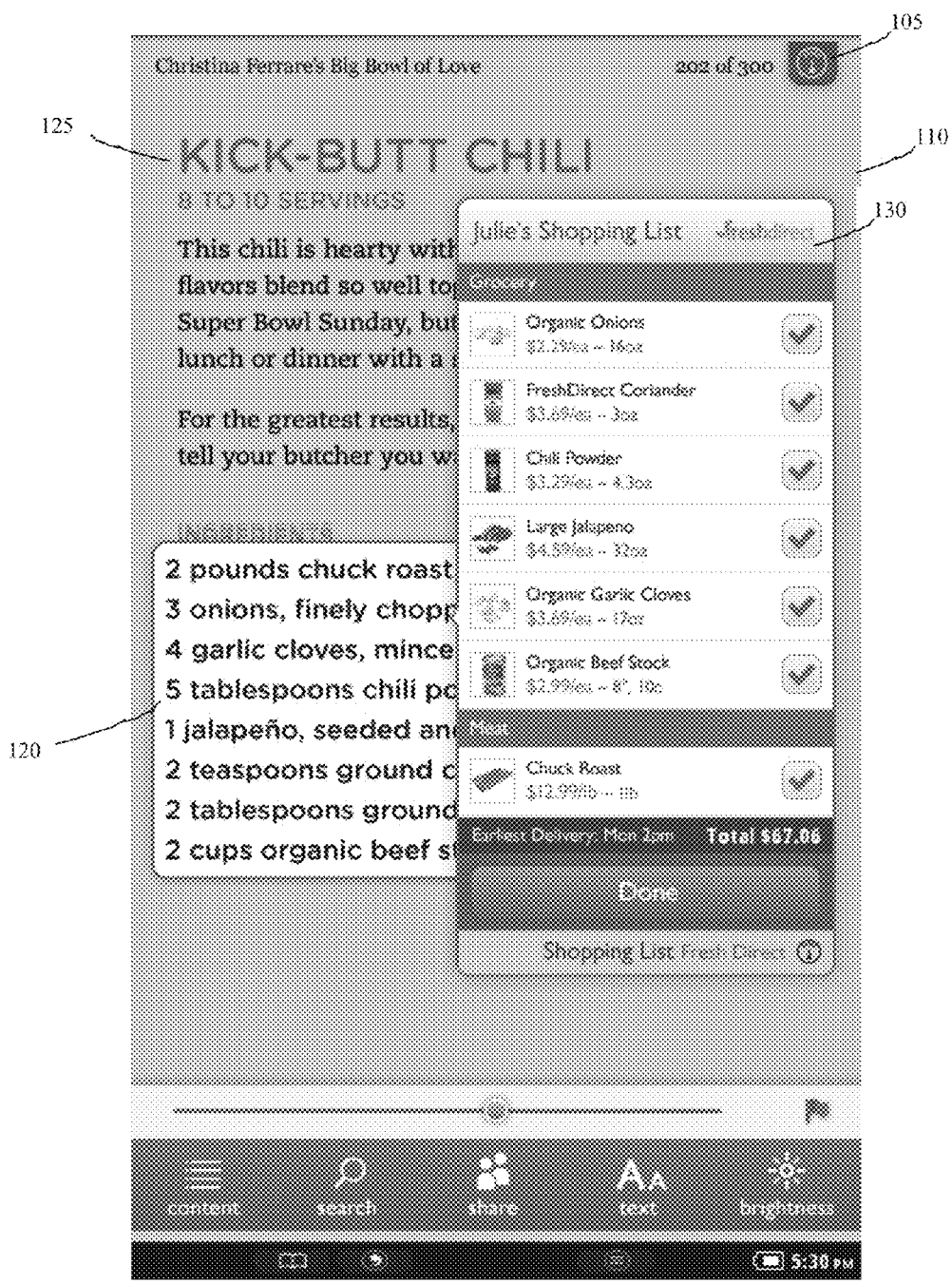
FIG. 2 depicts an exemplary use of a widget in association with an eBook.

FIG. 2 depicts a page 110 in the eBook 100 for a specific recipe. As shown in this illustration, the page 110 contains an icon 105 that indicates that some content on this page 110 is "widget-activated." In a preferred embodiment of the present invention the publisher of the eBook 100 has "tagged" the pertinent sections of the eBook 100 that are capable of being associated with a widget. In the example illustrated in FIG. 2, the icon 105 appears because the publisher has indicated by a tag in the eBook 100 that the Ingredients section 120 on page 110 is content that could be associated with a widget. In a preferred embodiment, the "tags" inserted by a publisher are not specific in identifying a specific widget that should be associated with particular content. Rather, the "tags" remain widget agnostic and provide a generic description of the content they are tagging. For example in the embodiment illustrated in FIG. 2, the publisher tag may generically describe the content 120 as "Ingredients" content. It is then up to the user, employing the reader software application to associate a specific widget with the tagged content, as further described below.

In essence, the publisher activates portions of the eBook for book widget use. In this preferred embodiment, the maker of eBook reading devices or eBook software provides the publisher with a lexicon of book widget tags that the publisher can use. In the above example depicted in FIG. 2, the publisher of the cook book eBook 100 would select a "Ingredients" tag or a "Shopping list" widget tag (for example: shoppinglist_bookwidget.apk) from the lexicon of widget tags previously provided and then tag the Ingredients section 120 of the recipe 110 within the eBook 100. In an alternative embodiment, the publisher can tag the content in an eBook with specific widgets.

In the example illustrated in FIG. 2, the user taps on the icon 105 to see which portions of the content on page 110 are "widget-activated." In example illustrated in FIG. 2, only the Ingredients section 120 is "widget-activated," As appreciated by those skilled in the art, several sections of content on a particular page can be "widget-activated" For example, the publisher can also tag the title "Kick-Butt Chili" 125.

If the user has not previously associated a particular widget with a tagged section of content, when the user selects, taps on, a section of "widget-activated" content, the eReader software displays a list of the widgets that they user already owns or can purchase for use with the tagged content. The system has a description of a universe of widgets that can be used with "widget-activated" content. Using these descriptions and the tags supplied by the publisher, the system can determine which widgets are suitable for association with which tags. For example, with respect to the Ingredients "widget-activated" content 120 illustrated in FIG. 2, suitable widgets might include Shopping List widgets used to create a shopping list for the ingredients or Ingredients Description widgets that can provide photographs, the history and use of, and a general description of specific ingredients.

As described above, when selecting specific "widget-activated" content, the system displays a list of the widgets that the user already owns that can be associated with the selected content. The user can then chose to associate one of the widgets she owns with the selected content. The selected widget is then associated with the tagged content and executed by the eReader device. In a preferred embodiment, each widget, when executed, is brought up in a separate window on the display of the user's device. In this preferred embodiment, the selected widget is thereafter associated with the selected content and whenever the user selects this specific content, the system executes the associated widget. This association between the selected widget and the selected content can be stored directly in the eBook electronic document. The user also has the option of changing the widget that is associated with the specific content.

As also described above, when selecting a specific "widget-activated" section of content, the system displays a list of the widgets that the user can purchase or otherwise acquire (some widgets can be downloaded for free) that can be associated with the selected content. If the user selects to purchase or otherwise acquire a new widget, the system leads the user through the acquisition process and the new widget is downloaded and stored on the user's device, e.g., the user's mobile eReader device. The newly acquired widget is then associated with the tagged content and executed by the eReader device.

In the example illustrated in the FIG. 2, the user had previously associated the Ingredients content 120 with a particular shopping widget 130, a Shopping List widget from an online ordering grocery store, Freshdirect™. When the a "widget-activated" Ingredients list 120 that is displayed on the recipe page 100 is selected by the user, the system launches the Freshdirect™ Shopping List book widget 130 which is opened in a separate window. In the particular example depicted in FIG. 2, the particular widget 130 automatically populates the user's Fresh Direct™ shopping cart with the ingredients required to cook the selected recipe depicted in page 110. The particular widget 130 allows the user to modify the shopping list, check availability for the selected ingredients, check the total price if all of the ingredients are purchased, select a delivery window, and place the order, all without leaving the specific page 110 of the eBook 100.

eBooks can have several pre-installed widgets and widgets that are available for purchase and download. Users are able to remove widgets, add new widgets, and depending on the usage rights, be able to use widgets across eBooks.

The use of widgets in eBooks according to the present invention is guided, in part, by two principles. First, a widget used in an eBook preferably does not detract from the reading experience by taking the user away from the eBook page. The widget preferably operates in a small window displayed on the same page that the reader is viewing. Second, a widget enhances the reading experience of the user by adding value to the experience by operating within the context of the eBook.

In the preferred embodiment, the maker of eBook reading devices or eBook software works with a network of third party developers to create book widgets that can be made available to users and publishers alike. In an exemplary scenario, an eBook user opens an eBook, arrive at a recipe, discovers the available shopping list widgets, and acquires, purchases, and downloads the desired shopping list widget. Alternatively, if eBook user already has a shopping list widget on their device the user can associate the resident widget with the "widget-activated" content.

The following is example code for the tag associated with the Ingredients section 120 in the above example depicted in FIG. 2:

```
<metadata>
    <meta property="shopping-list-book-widget-href"
>Files/kickbuttchili_ingredients.xhtml</meta>
    <meta property="shopping-list-book-widget-itemref" >kbc_ing</meta>
</metadata>
```

Figure 3:
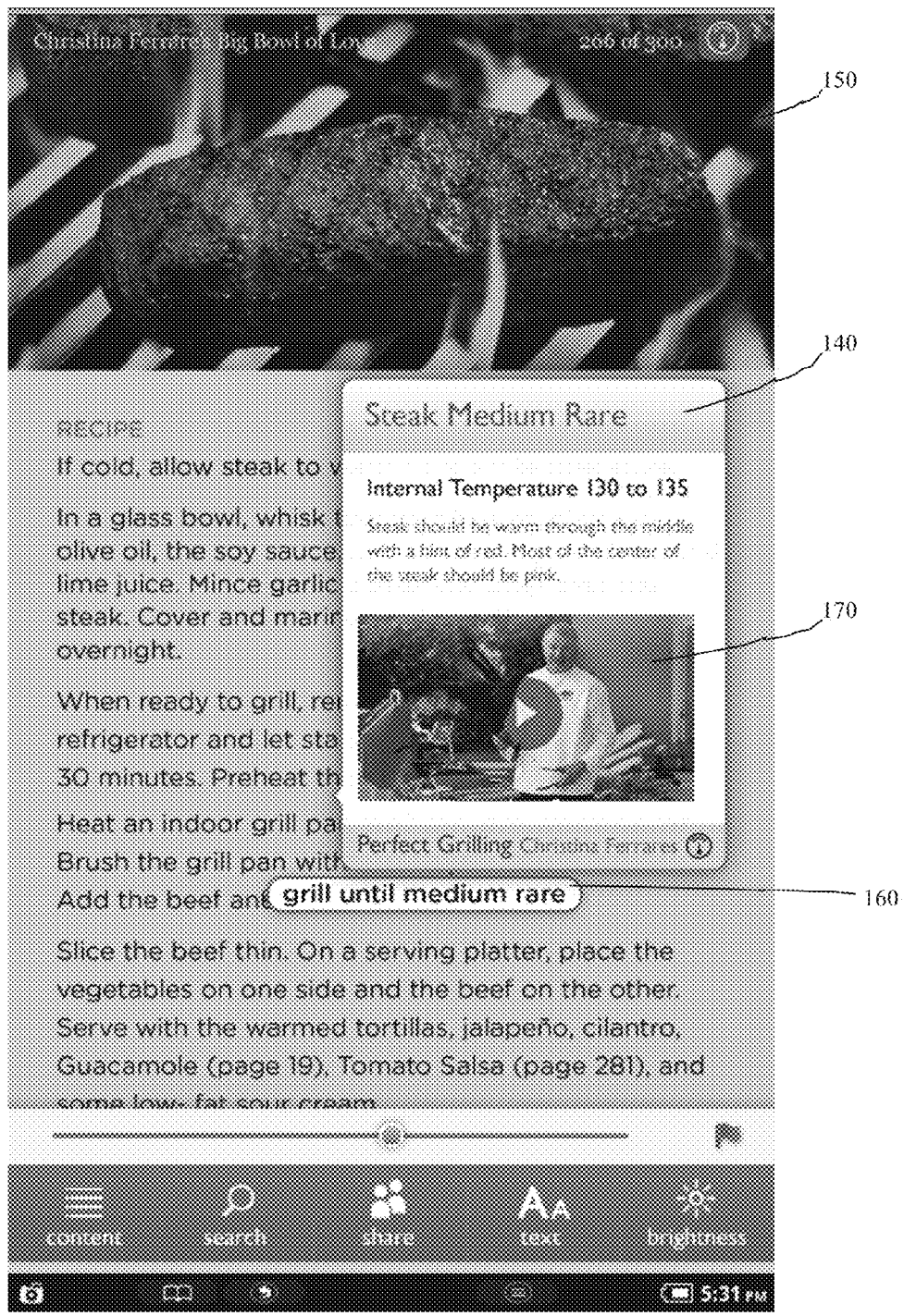
FIG. 3 illustrates a video widget associated with specific content in an eBook.

FIG. 3 illustrates a widget 140 used for cooking tips. In the example illustrated in this Figure, the recipe found on a page 150 in the eBook describes a recipe for grilled steak. On a portion of the page is an instruction 160 to "grill until medium rare," This phrase 160 on the page 150 is widget-activated, and when clicked, tapped, selected, by the user will launch the cooking tip widget 140. Specifically, this widget provides further cooking instructions as to how a steak is grilled medium rare. The widget 140 can even play a short video 170 further instructing a user how to accomplish a medium rare grilling of a steak.

Figure 4:
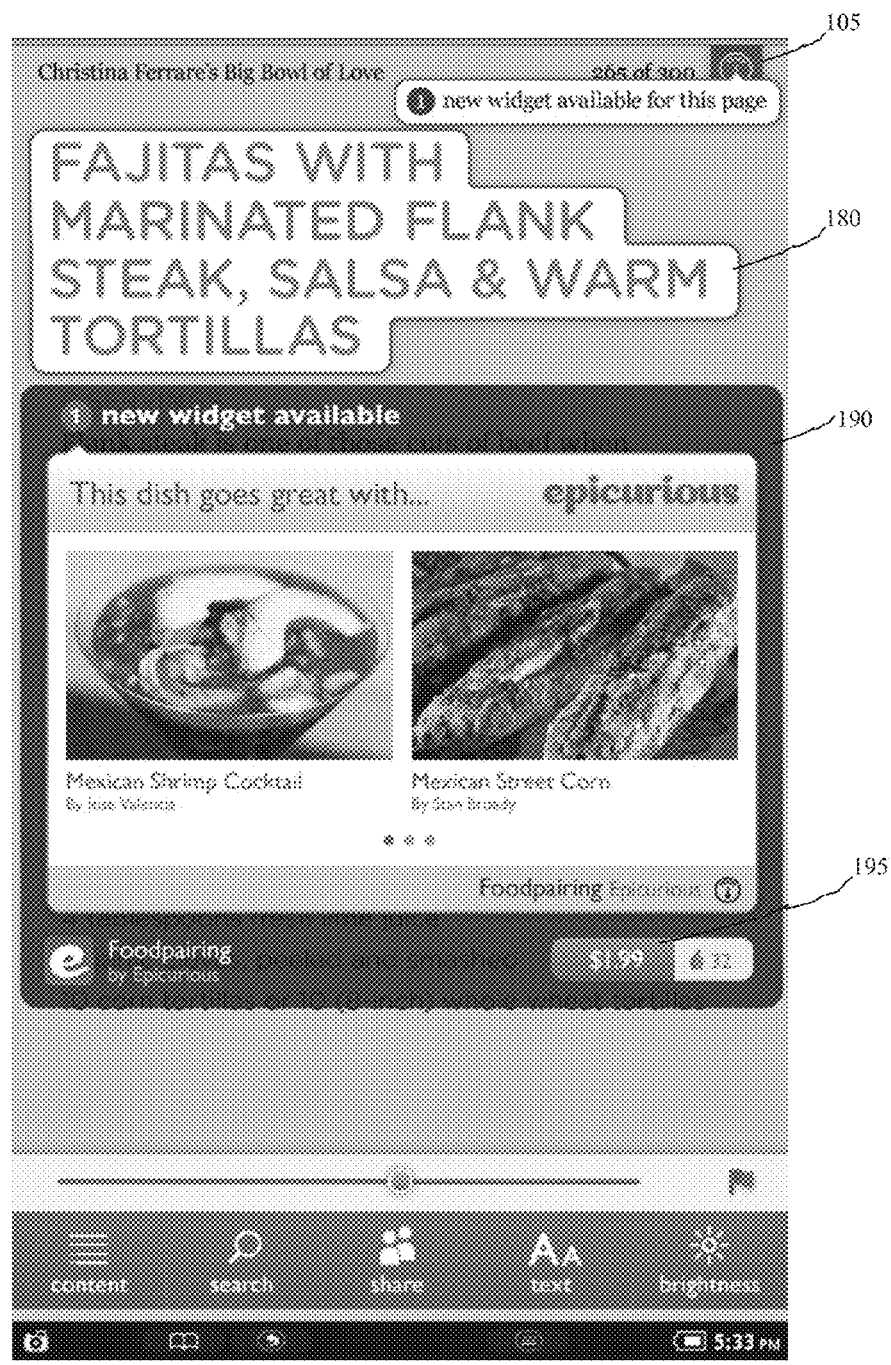
FIG. 4 depicts new widgets that can be associated with content in an eBook.

FIG. 4 illustrates the system informing the user that a new widget is available in association with the information being displayed on the eBook page being viewed. As previously described, the user can tap on icon 105 to see the "widget-activated" content on a page. In the example depicted on FIG. 4, the title 180 is "widget-activated," As the user clicks on the title 180, a description of the new widget 190 is launched. This specific widget 190 is one that pairs particular recipes, foods, with other recipes, foods. As described above, if the user is interested, she can click on the price button 195 to purchase, download, store and execute the widget 190.

Figure 5:
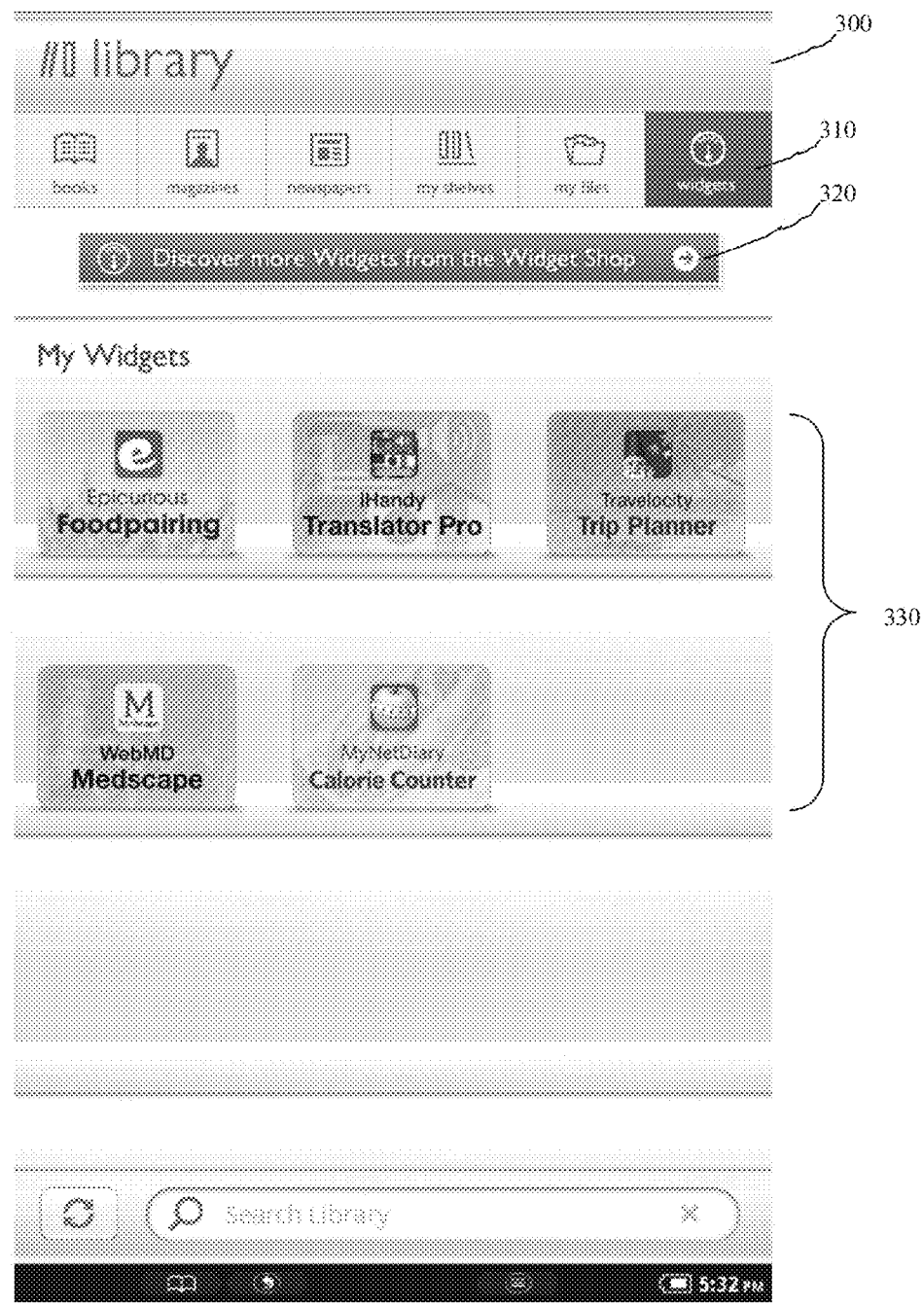
FIG. 5 depicts a user's Library displaying the user's widgets.

FIG. 5 illustrates the "home" user interface page 300 of the eBook user's library that contains a tab 310 that, when selected, displays all of the user's widgets 330. Interface page 300 contains tabs that the user can tap to view all of the items available on her device or through her account, such as books, magazines or newspapers. By tapping on the widget tab 310, the lower part of the page is populated with all of the widgets 330 to which the user has rights. The user interface page 300 further has a selectable link 320 that the user can tap to go to a site for purchasing or otherwise downloading additional widgets. If the user taps on this link 320, she is brought to a "Widget Shop" page 340 as illustrated in FIG. 6.

Figure 6:
FIG. 6 illustrates a user interface for obtaining new widgets.

As shown in FIG. 6, on the Widget Shop page 340, the maker of the eBook reading device or eBook software has an area 350 that can make personalized recommendations to the user for widgets, based, at least in part, on the eBooks and or widgets that the system knows the user owns. In area 360, the user can scroll (horizontally in the embodiment shown in this figure) different categories of widgets, such as Top Selling Widgets. In area 370, the user can perform a word search for a specific type of widget for which she is looking.

Figure 7:
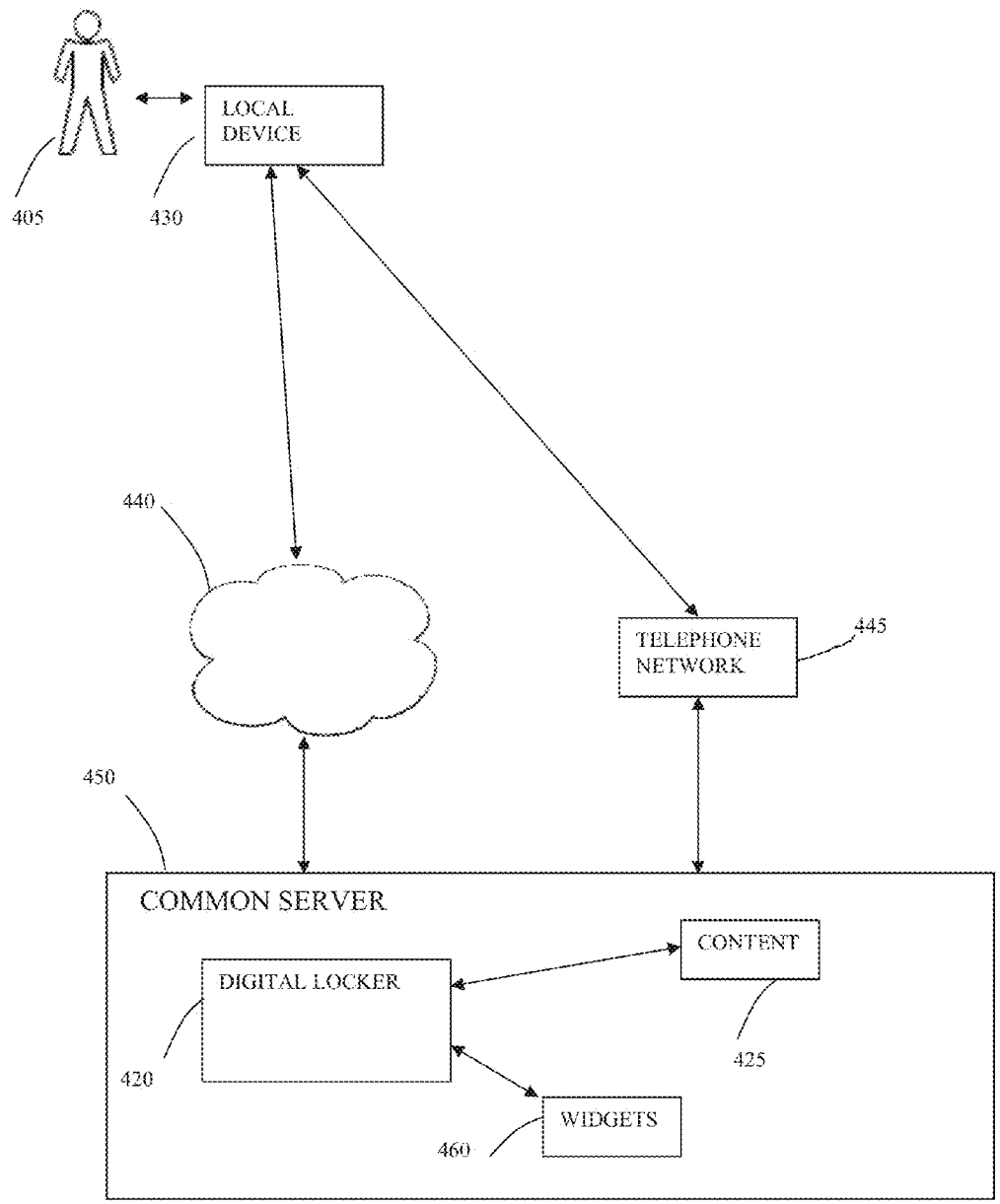
FIG. 7 illustrates an exemplary embodiment of a system according to the present invention.

FIG. 7 shows components of a system according to the present invention. User 405 is an authorized user of the system and uses her local device 430 for the reading of digital content. Many of the functions of system are carried out on server 450. As appreciated by those skilled in the art, many of the functions described herein can be divided between the server 450 and the user's local device 430. Further, as also appreciated by those skilled in the art, server 450 can be considered a "cloud" with respect to the user and her local device 430. The cloud can actually be comprised of several servers performing interconnected and distributed functions. For the sake of simplicity in the present discussion, only a single server 450 will be described. The user 405 can connect to the server 450 via the Internet 440, a telephone network 445 (e.g., wirelessly through a cellphone network) or other suitable electronic communication means. User 405 has an account on lending server 450, which authorizes user 405 to use the system.

Associated with the user's 405 account is the user's digital locker 420 located on the server 450. As further described below, in the preferred embodiment of the present invention, digital locker 420 contains links to copies of digital content 425 previously purchased (or otherwise legally acquired) by user 405.

Indicia of rights to all copies of digital content 425 owned by user 405, including digital content 425, e.g., an eBook, is stored by reference in the user's digital locker 420. Digital locker 420 is a remote online repository that is uniquely associated with the user's 405 account. As appreciated by those skilled in the art, the actual copies of the digital content 425 are not necessarily stored in the user's locker 420, but rather the locker 420 stores an indication of the rights of the user to the particular content 425 and a link or other reference to the actual digital content 425. Typically, the actual copy of the digital content 425 is stored in another mass storage (not shown). The digital lockers 420 of all of the users who have purchased a copy of a particular digital content 425 would point to this copy in mass storage. Of course, back up copies of all digital content 425 are maintained for disaster recovery purposes. Although only one example of digital content 425 is illustrated in this Figure, it is appreciated that the lending server 450 can contain millions of files 425 containing digital content. It is also contemplated that the server 450 can actually be comprised of several servers with access to a plurality of storage devices containing digital content 425. As further appreciated by those skilled in the art, in conventional licensing programs, the user does not own the actual copy of the digital content, but has a license to use it. Hereinafter, if reference is made to "owning" the digital content, it is understood what is meant is the license or right to use the content.

Similarly, all of the widgets owned by user 405 contain references in the user's digital locker 420 to the widget library 460. Although shown in FIG. 7 as appearing as residing on server 450, as known to those skilled in the art, the widgets 460 can also be stored on servers of the third party vendors of widgets.

User 405 can access his or her digital locker 420 using a local device 430. Local device 430 is an electronic device such as a personal computer, an e-book reader, a smart phone or other electronic device that the user 405 can use to access the server 450. In a preferred embodiment, the local device has been previously associated, registered, with the user's account using user's account credentials. Local device 430 provides the capability for user 405 to download user's copy of digital content 425 via his or her digital locker 420. After digital content 425 is downloaded to local device 430, user 405 can engage with the downloaded content locally, e.g., read the book, listen to the music or watch the video.

In a similar vein, all of the user's widgets 460, including those that have been associated with their digital content 425 can be downloaded, stored and executed on the user's local device 430.

In a preferred embodiment, local device 430 includes a non-browser based device interface that allows user 405 to initiate the functionality of the system in a non-browser environment. Through the device interface, the user 405 is automatically connected to the server 450 in a non-browser based environment. This connection to the server 450 is a secure interface and can be through the telephone network 445, typically a cellular network for mobile devices. If user 405 is accessing his or her digital locker 420 using the Internet 440, local device 430 also includes a web account interface. Web account interface provides user 405 with browser-based access to his or her account and digital locker 420 over the Internet 440. Using either of these two interfaces, the user is able to read their content 425 and execute their widgets 460 remotely.

Figure 8:
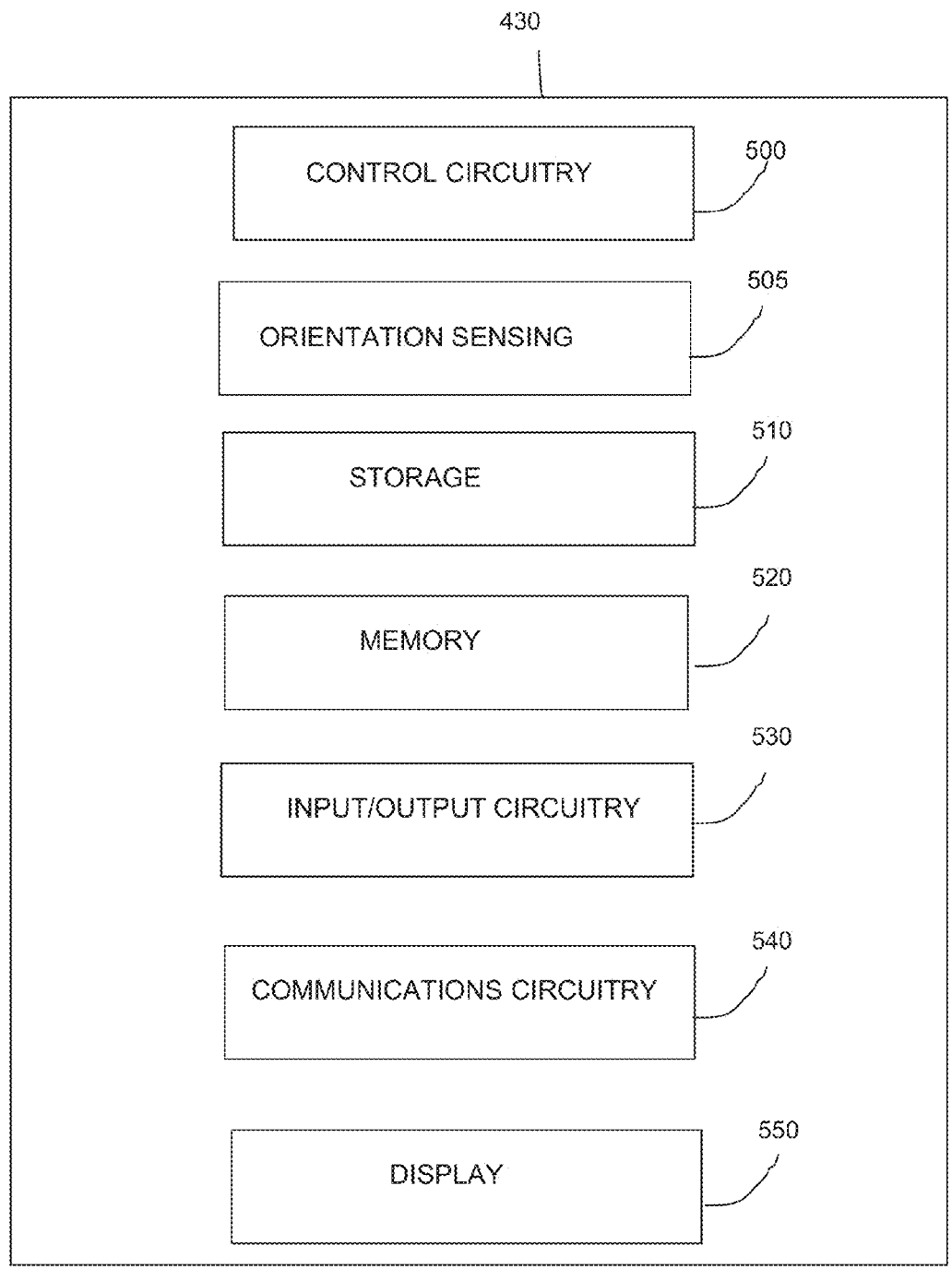
FIG. 8 illustrates the components of an exemplary device.

FIG. 8 illustrates an exemplary local device 430. As appreciated by those skilled the art, the local device 430 can take many forms capable of operating the present invention. As previously described, in a preferred embodiment the local device 430 is a mobile electronic device, and in an even more preferred embodiment device 430 is an electronic reader device. Electronic device 430 can include control circuitry 500, storage 510, memory 520, input/output ("I/O") circuitry 530, communications circuitry 540, and display 550. In some embodiments, one or more of the components of electronic device 430 can be combined or omitted, e.g., storage 510 and memory 520 may be combined. As appreciated by those skilled in the art, electronic device 430 can include other components not combined or included in those shown in FIG. 8, e.g., a power supply such as a battery, an input mechanism, etc.

Electronic device 430 can include any suitable type of electronic device. For example, electronic device 430 can include a portable electronic device that the user may hold in his or her hand, such as a digital media player, a personal e-mail device, a personal data assistant ("PDA"), a cellular telephone, a handheld gaming device, a tablet device or an eBook reader. As another example, electronic device 130 can include a larger portable electronic device, such as a laptop computer. As yet another example, electronic device 430 can include a substantially fixed electronic device, such as a desktop computer.

Control circuitry 500 can include any processing circuitry or processor operative to control the operations and performance of electronic device 430. For example, control circuitry 500 can be used to run operating system applications, firmware applications, media playback applications, media editing applications, or any other application. Control circuitry 500 can drive the display 550 and process inputs received from a user interface, e.g., the display 550 if it is a touch screen.

Orientation sensing component 505 include orientation hardware such as, but not limited to, an accelerometer or a gyroscopic device and the software operable to communicate the sensed orientation to the control circuitry 500. The orientation sensing component 505 is coupled to control circuitry 500 that controls the various input and output to and from the other various components. The orientation sensing component 505 is configured to sense the current orientation of the portable mobile device 430 as a whole. The orientation data is then fed to the control circuitry 500 which control an orientation sensing application. The orientation sensing application controls the graphical user interface (GUI), which drives the display 550 to present the GUI for the desired mode.

Storage 510 can include, for example, one or more tangible computer storage mediums including a hard-drive, solid state drive, flash memory, permanent memory such as ROM, magnetic, optical, semiconductor, paper, or any other suitable type of storage component, or any combination thereof. Storage 510 can store, for example, media content, e.g., eBooks, music and video files, application data, e.g., software for implementing functions on electronic device 430, firmware, user preference information data, e.g., content preferences, authentication information, e.g., libraries of data associated with authorized users, transaction information data, e.g., information such as credit card information, wireless connection information data, e.g., information that can enable electronic device 430 to establish a wireless connection), subscription information data, e.g., information that keeps track of podcasts or television shows or other media a user subscribes to, contact information data, e.g., telephone numbers and email addresses, calendar information data, and any other suitable data or any combination thereof. The instructions for implementing the functions of the present invention may, as non-limiting examples, comprise non transient software and/or scripts stored in the computer-readable media 510.

Memory 520 can include cache memory, semi-permanent memory such as RAM, and/or one or more different types of memory used for temporarily storing data. In some embodiments, memory 520 can also be used for storing non transient data used to operate electronic device applications, or any other type of data that can be stored in storage 510. In some embodiments, memory 520 and storage 510 can be combined as a single storage medium.

I/O circuitry 530 can be operative to convert, and encode/decode, if necessary analog signals and other signals into digital data. In some embodiments, I/O circuitry 530 can also convert digital data into any other type of signal, and vice-versa. For example, I/O circuitry 530 can receive and convert physical contact inputs, e.g., from a multi-touch screen, i.e., display 550, physical movements, e.g., from a mouse or sensor, analog audio signals, e.g., from a microphone, or any other input. The digital data can be provided to and received from control circuitry 500, storage 510, and memory 520, or any other component of electronic device 430. Although I/O circuitry 530 is illustrated in FIG. 8 as a single component of electronic device 130, several instances of I/O circuitry 530 can be included in electronic device 430.

Electronic device 430 can include any suitable interface or component for allowing a user to provide inputs to I/O circuitry 530. For example, electronic device 430 can include any suitable input mechanism, such as a button, keypad, dial, a click wheel, or a touch screen, e.g., display 550. In some embodiments, electronic device 430 can include a capacitive sensing mechanism, or a multi-touch capacitive sensing mechanism.

In some embodiments, electronic device 430 can include specialized output circuitry associated with output devices such as, for example, one or more audio outputs. The audio output can include one or more speakers, e.g., mono or stereo speakers, built into electronic device 430, or an audio component that is remotely coupled to electronic device 430, e.g., a headset, headphones or earbuds that can be coupled to device 430 with a wire or wirelessly.

Display 550 includes the display and display circuitry for providing a display visible to the user. For example, the display circuitry can include a screen, e.g., an LCD screen, that is incorporated in electronic device 430. In some embodiments, the display circuitry can include a coder/decoder (Codec) to convert digital media data into analog signals. For example, the display circuitry or other appropriate circuitry within electronic device 430 can include video Codecs, audio Codecs, or any other suitable type of Codec.

The display circuitry also can include display driver circuitry, circuitry for driving display drivers, or both. The display circuitry can be operative to display content, e.g., media playback information, application screens for applications implemented on the electronic device 430, information regarding ongoing communications operations, information regarding incoming communications requests, or device operation screens, under the direction of control circuitry 500. Alternatively, the display circuitry can be operative to provide instructions to a remote display.

Communications circuitry 540 can include any suitable communications circuitry operative to connect to a communications network and to transmit communications, e.g., data from electronic device 430 to other devices within the communications network. Communications circuitry 540 can be operative to interface with the communications network using any suitable communications protocol such as, for example, Wi-Fi, e.g., a 802.11 protocol, Bluetooth, radio frequency systems, e.g., 900 MHz, GHz, and 5.6 GHz communication systems, infrared, GSM, GSM plus EDGE, CDMA, quadband, and other cellular protocols, VOIP, or any other suitable protocol.

Electronic device 430 can include one more instances of communications circuitry 540 for simultaneously performing several communications operations using different communications networks, although only one is shown in FIG. 8 to avoid overcomplicating the drawing. For example, electronic device 430 can include a first instance of communications circuitry 540 for communicating over a cellular network, and a second instance of communications circuitry 540 for communicating over Wi-Fi or using Bluetooth. In some embodiments, the same instance of communications circuitry 540 can be operative to provide for communications over several communications networks.

In some embodiments, electronic device 430 can be coupled to a host device such as digital content control server 450 for data transfers, synching the communications device, software or firmware updates, providing performance information to a remote source, e.g., providing riding characteristics to a remote server, or performing any other suitable operation that can require electronic device 130 to be coupled to a host device. Several electronic devices 430 can be coupled to a single host device using the host device as a server. Alternatively or additionally, electronic device 430 can be coupled to several host devices, e.g., for each of the plurality of the host devices to serve as a backup for data stored in electronic device 430.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

The invention claimed is:

1. A method for employing widgets in a preexisting digital publication comprising:
   displaying a page of the preexisting digital publication;
   receiving input indicating a selection of a specific portion of content from the displayed page;
   determining if a tag has been associated with the specific portion of content, the tag identifying that preexisting widgets can be associated with the specific portion of content and containing a generic description of the specific portion of content;
   displaying available preexisting widgets that have been previously associated with the generic description contained in the tag, the available preexisting widgets including preexisting widgets previously acquired and preexisting widgets that are available to be acquired;
   receiving input indicating a selection of one of the available preexisting widgets to associate with the specific portion of content;
   if the received input indicates selection of a desired preexisting widget that is available to be acquired:
      contacting a remote computer server,
      requesting a download of the desired preexisting widget, and
      downloading the desired preexisting widget;
   associating the selected preexisting widget with the specific portion of content;
   receiving input indicating activation of the preexisting widget; and
   executing the preexisting widget in a window on the displayed page.

2. The method of claim 1, wherein the selected preexisting widget contains video content, the method further comprising executing the video content in the window on the displayed page.

3. The method of claim 1, wherein the window on the displayed page is smaller than the entire page.

4. The method of claim 1, further comprising storing the selected preexisting widget in association with the preexisting digital publication.

5. The method of claim 1, wherein the preexisting digital publication is an electronic book.

6. The method of claim 1, further comprising:
   displaying a library user interface that displays all of the preexisting widgets previously acquired.

7. The method of claim 1, further comprising:
   displaying a shopping user interface that displays preexisting widgets available to be acquired.

8. A system for employing widgets in preexisting digital publication comprising:
   a memory that includes instructions for operating the system, and includes a preexisting digital publication database containing the preexisting digital publication;
   a display;
   control circuitry coupled to the memory and coupled to the display, the control circuitry capable of executing the instructions and is operable to at least:
   display a page of the preexisting digital publication on the display;
   receive input indicating a selection of a specific portion of content from the displayed page;
   determine if a tag has been associated with the specific portion of content, the tag identifying that preexisting widgets can be associated with the specific portion of content and containing a generic description of the specific portion of content;
   display, on the display, available preexisting widgets that have been previously associated with the generic description contained in the tag, the preexisting available widgets including widgets previously acquired and widgets that are available to be acquired;
   receive input indicating a selection of one of the available preexisting widgets to associate with the specific portion of content;
   if the received input indicates selection of a desired preexisting widget that is available to be acquired:
      contacting a remote computer server,
      requesting a download of the desired preexisting widget, and
      downloading the desired preexisting widget;
   associating the selected preexisting widget with the specific portion of content;
   receive input indicating activation of the preexisting widget; and
   execute the preexisting widget in a window on the displayed page.

9. The system of claim 8, wherein the selected preexisting widget contains video content, the control circuitry is further operable to execute the instructions to execute the video content in the window on the displayed page.

10. The system of claim 8, wherein the window on the displayed page is smaller than the entire page.

11. The system of claim 8, wherein the control circuitry is further operable to execute the instructions to store the selected widget in association with the preexisting digital publication.

12. The system of claim 8, wherein the preexisting digital publication is an electronic book.

13. The system of claim 8, wherein the control circuitry is further operable to execute the instructions to display a library user interface that displays all of the preexisting widgets previously acquired.

14. The system of claim 8, wherein the control circuitry is further operable to execute the instructions to display a shopping user interface that displays preexisting widgets available to be acquired.

* * * * *